(No Model.) 3 Sheets—Sheet 2.
D. N. OSYOR.
ELECTRIC MOTOR AND DEVICE FOR CONDUCTING CURRENTS THERETO.
No. 575,615. Patented Jan. 19, 1897.
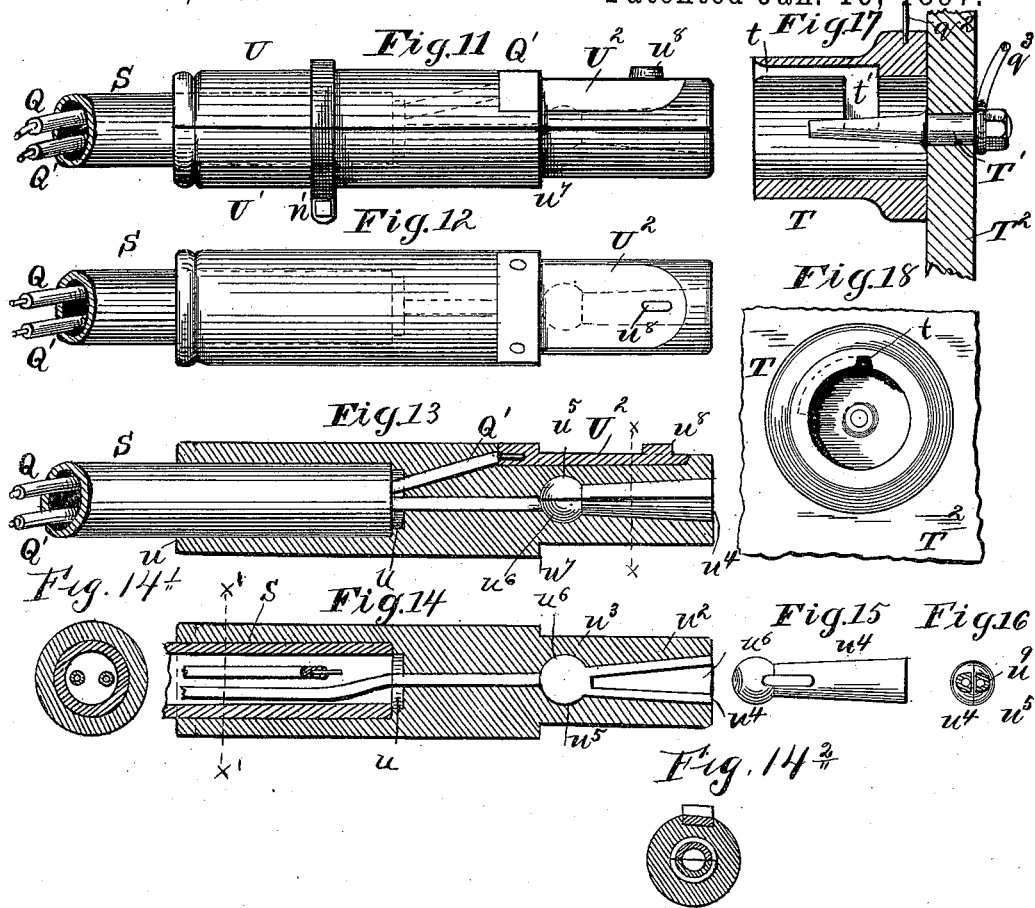
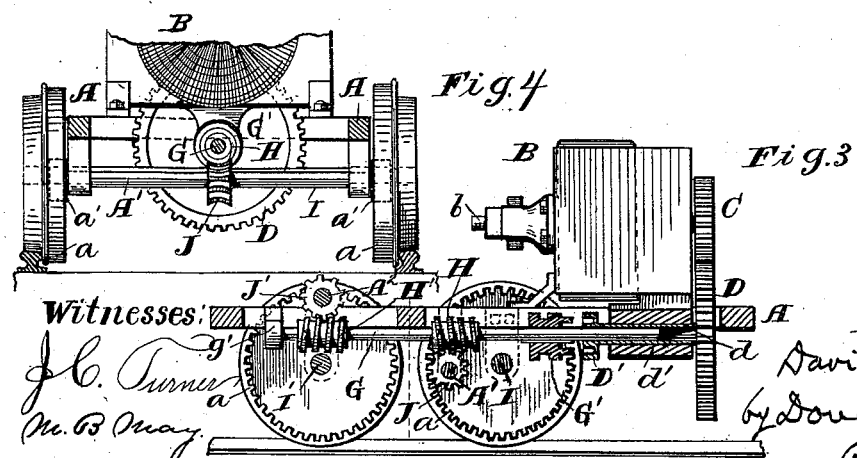
Witnesses:
J. C. Turner
M. B. May
Inventor:
David N. Osyor
by Doubleday & Kiss
Attys (No Model.) 3 Sheets—Sheet 3.
D. N. OSYOR.
ELECTRIC MOTOR AND DEVICE FOR CONDUCTING CURRENTS THERETO.
No. 575,615. Patented Jan. 19, 1897.
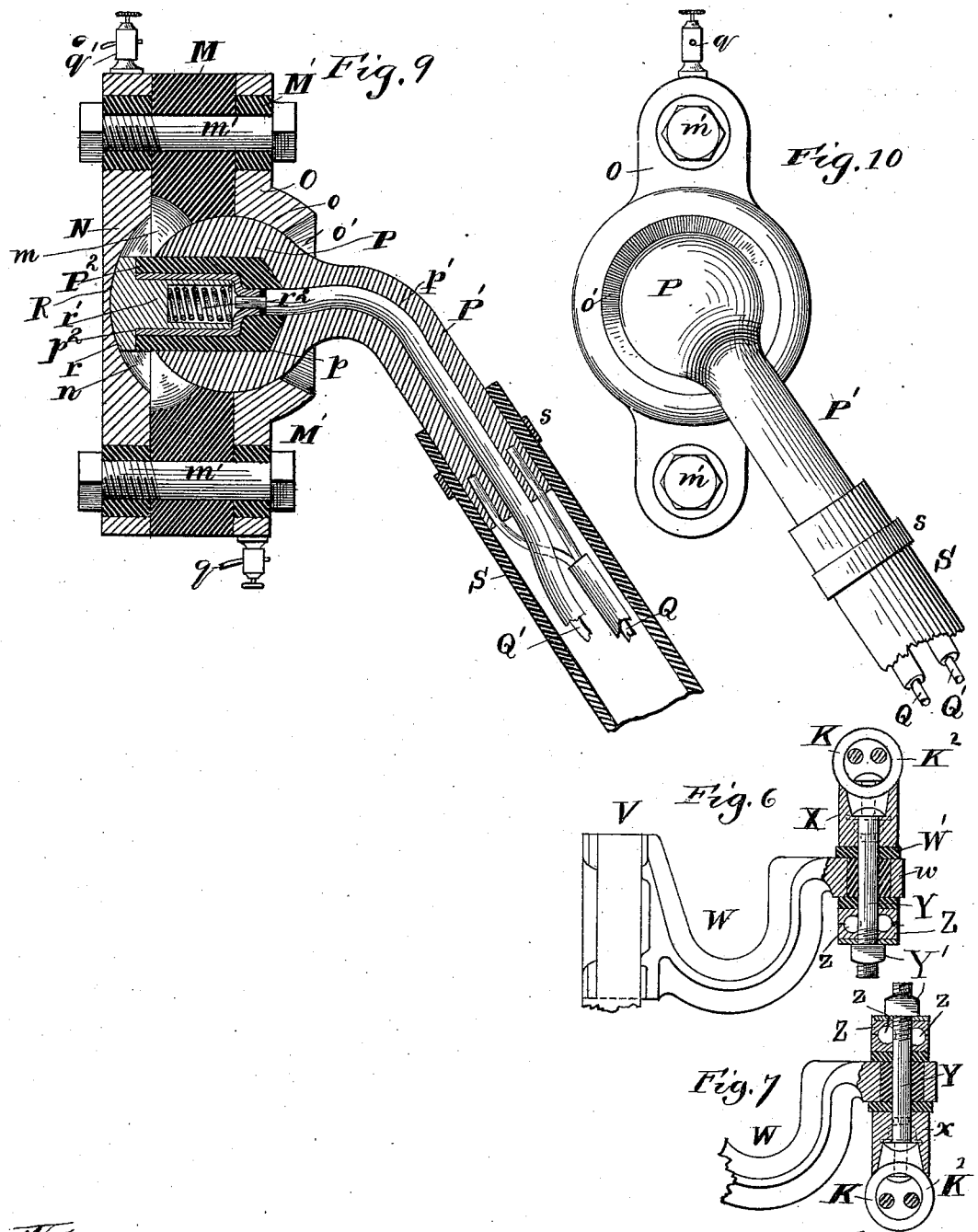

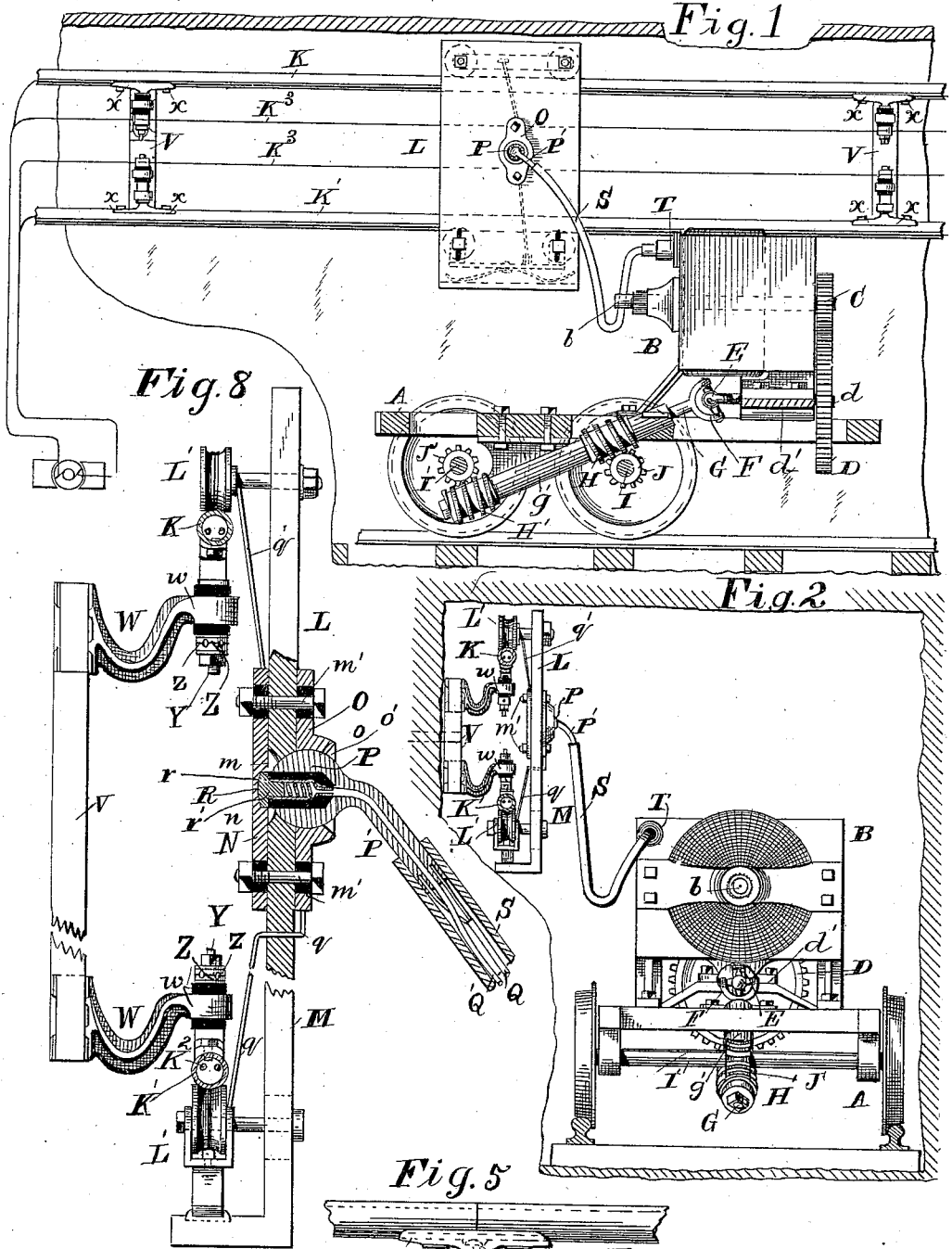

UNITED STATES PATENT OFFICE.

DAVID N. OSYOR, OF NEWARK, OHIO, ASSIGNOR TO J. A. JEFFREY, OF COLUMBUS, OHIO.

ELECTRIC MOTOR AND DEVICE FOR CONDUCTING CURRENTS THERETO.

SPECIFICATION forming part of Letters Patent No. 575,615, dated January 19, 1897.

Application filed October 17, 1889. Serial No. 327,268. (No model.)

*To all whom it may concern:*

Be it known that I, DAVID N. OSYOR, a citizen of the United States, residing at Newark, in the county of Licking and State of Ohio, have invented certain new and useful Improvements in Electric Motors and Devices for Conducting Currents Thereto, of which the following is a specification, reference being had therein to the accompanying drawings.

This invention relates to improvements in cars, particularly motor-cars, such as are adapted for use in mine-railways. It is especially intended for use in connection with electric engines when employed with such cars to propel them. Much difficulty has been experienced in providing cars of this sort and for this purpose which should have the moving parts properly speeded, and which should be sufficiently compact, that is to say, have the parts spaced within a compass small enough to permit the car to be used in limited spaces. When use is made of electric engines, it is of advantage that the armature should be allowed to run at a high speed for well-known electrical reasons. At the same time it is necessary that the speed of the finally-driven wheels, that is, the track-wheels, should be relatively slow. To reduce the high speed of the armature to the slow speed of the track-wheels, use has been made of intermediate gearing comprising a number of wheels. This number has been comparatively large on account of the reduction of speed. Consequently the parts on the cars have been numerous, and have occupied so much room that the cars are unwieldy and inconvenient. I obviate these difficulties by combining with the electric motor and with the track-wheels a counter-shaft driven from the armature-shaft by gear-wheels, and then take the power by means of the worm-shaft to both of the axles simultaneously, that is to say, a shaft having two worms, one engaging with one axle and one with the other.

Figure 1 is a side view of a car and of devices for supplying current thereto constructed and arranged in accordance with my improved system. Fig. 2 is an end view of the same. Fig. 3 is a side view, partly in section, of a modified form of a car. Fig. 4 is an end view of the same. Fig. 5 shows parts of two adjacent ends of the tubular trolley-track and the means for coupling and supporting them. Fig. 6 is a side view, on enlarged scale, of the parts shown in Fig. 5, some being in vertical section. Fig. 7 is a view similar to that in Fig. 6, except that the parts for attaching the tubular track to the bracket are inverted. Fig. 8 is a view, partly in side elevation and partly in vertical section, of the trolley-carriage and the tubular tracks for supporting it and conveying current to and from it. Fig. 9 is a section, on enlarged scale, of the flexible joint (in one form) which I interpose at certain points in the circuit. Fig. 10 is a face view of that in Fig. 9. Fig. 11 is a side view of the detachable handle or terminal supporter attached to the portable conductor which I employ for certain purposes. Fig. 12 is a top view of the same. Figs. 13 to 16 show details in the construction thereof, Figs. 14' and 14² being sections on lines $x\ x$ and $x'\ x'$ of Figs. 13 and 14, respectively. Fig. 17 is a vertical section, and Fig. 18 an end view, of the socket for the detachable part in Fig. 11. Fig. 19 is a detail view of a collecting-wheel on the contact-carriage.

Referring to Figs. 1 and 2, A represents the sills or framework of the platform of a car. For use in mines this car is short, seldom over from eight to ten feet in length, and the axles are comparatively close together. As shown, I mount a motor on the car as near as possible to one end thereof, the one illustrated being represented as a whole by B. The armature-shaft $b$ is provided with a pinion C, which engages with a gear-wheel D below it. This wheel is on a shaft $d$, mounted in bearings at $d'\ d'$. At the inner end the shaft $d$ carries one part of a universal-joint piece E, the other part being on the inclined shaft G, mounted in any suitable bearings, as at $g'$. This shaft is provided with worms H H', one of them having a right-hand thread and the other a left-hand thread. The axles I I' are respectively provided with worm-wheels J J', with which the worms H H' engage. By having the shaft inclined in the way described the worm H' can be arranged below its wheel I', while the worm H is situated above its corresponding wheel. Hence the axles I I' will be turned in the same direction, notwithstanding the fact that the threads on the worms are oppositely inclined. By having said threads opposite to each other the end thrust of each on the shaft is counterbalanced by the thrust of the other, and therefore the great disadvantage incident to the use of worms is overcome. It is apparent that the use of the worm-gearing is of great advantage in reducing the high speed of the driving parts to the ultimate speed of the driven parts, as it can be done with few parts. The worm-gearing being situated beneath the platform enables me to utilize the space thereunder for the speed-reducing mechanism, and consequently the space above the platform is left free for the convenience of the operator, and this space is ordinarily very limited. This part of the invention relates particularly to improvements in electric cars adapted for use in mine-railways. Much difficulty has been experienced in providing cars of this sort and for this purpose, which should have the moving parts properly speeded, and which should be sufficiently compact, that is to say, have the parts placed within a compass small enough to permit the car to be used in limited spaces. When use is made of electric engines, it is of advantage that the armature should be allowed to run at a high speed for well-known electrical reasons. At the same time it is necessary that the speed of the finally-driven wheels—that is, the track-wheels—should be relatively slow. To reduce the high speed of the armature to the slow speed of the track-wheels, use has been made of intermediate gearing, comprising a number of wheels. This number has been comparatively large on account of the reduction of speed. Consequently the parts on the cars have been numerous and have occupied so much room that the cars are unwieldy and inconvenient. I obviate these difficulties by constructing the car and arranging the parts thereon in substantially the manner described and illustrated.

The present invention relates also to improvements in the means to be used in connection with such motors as those on the car at A for properly conducting electric current to them at all times.

K K' represent the conductors of an overhead system of distribution. As shown, these are formed of tubes or pipes, as is illustrated and described in my earlier application, Serial No. 311,978, filed May 24, 1889. I have, however, improved the means of supporting the tubular conductors K K' and have succeeded in overcoming difficulties experienced with those of earlier date and provide a cheaply-constructed and easily-applied means of supporting them in proper place and to means which can be readily applied or removed and replaced when necessity requires.

V indicates a wooden or other insulating supporting-bar adapted to be fastened to any suitable vertical support, as, for instance, to the side walls of the entry of a mine.

W W are metallic bracket-arms adapted to be readily secured to the parts V. Each has an eye $w$, in which and adjacent to which is placed insulating material, as at W'.

X is a metallic bracket-piece having a longitudinal recess adapted to receive the tubular conductor K or K', and also having a recess at $x'$ to receive the head of the fastening-bolt Y, the shank of which passes through the aforesaid insulation W' in eye $w$.

Z is a washer, and Y' a nut, by which all of the last-said parts can be firmly clamped in place.

The parts which I have just described can not only be cheaply constructed at the factory, but they can be readily put in place in the mine or wherever they are to be used.

The attachments to the brackets are such that the conductors K K' can be arranged either above the parts W, as in Fig. 6, or both below, as in Fig. 7, or the upper can be above and the lower can be below its bracket, as in Figs. 1, 2, 8, and others, or the upper one can be below its bracket and the lower above the bracket which carries it. That is to say, I can provide for the meeting of any of the varying conditions which are experienced in the erection of such a system of electric distribution.

At $z\,z$ apertures are formed in the washers Z, and through these can be passed supplemental conductor-wires required under those circumstances where the quantity of current to be carried is greater than should properly be delivered to the parts at K K'. It will be understood that some such connection with the dynamo as that illustrated in Fig. 1 is to be used, that is to say, the conductors K K' are connected with the feeders from the dynamo and also, under ordinary circumstances, wires $K^2$, which are passed through the hollow conductors; but as the hollow parts are made of metal as thin as is practicable, in order to have them of large diameter without being heavy, the current will often be too great in quantity to pass safely over them, and therefore in order to increase the cross-section of total metal I provide for adding the wires $K^3$ $K^3$ when necessary, as will be the case where a number of motors are to be supplied from the same main circuit for other purposes than haulage, as, for instance, motors operating drills, cutting-machines, fans, &c. By examining Figs. 2, 8, and others it will be seen that these supplemental wires $K^3$ are not in the way of the trolley-carriage or other moving parts.

L indicates as a whole a traveling support or carriage having contacts (preferably of the form of trolley-wheels) adapted to be fitted to the conductors K K'. For many of the purposes of the present invention this carriage may be of any of the ordinary sorts or of any preferred character; but I have found that much trouble and inconvenience are experienced in using the traveling contact-carriages heretofore constructed by reason of the fact that the strains and twisting actions on the wires are such as to soon crack and break them. Another source of trouble and loss is due to the difficulty with which the swinging or movable portion of the electric circuit, which is below the traveling contact-carriage, is detached from the said carriage. Again, there are a number of purposes besides that of operating the motor-cars for which it is desirable to use the electric current which necessitate the use of sections of the conductors adapted to be connected to and disconnected from the permanent or stationary conductors, as well as the mechanism where it is desired to apply the current. For instance, with portable cutting-machines it is necessary at frequent intervals to separate the conductors from the machines while the latter are being moved and subsequently effect connection again.

For obtaining all the above-described purposes and obviating all of the difficulties that have been mentioned the devices herein shown are provided.

M represents a board or other piece of insulating material forming part of or secured to the traveling contact-carriage L. To this is fastened an inner metallic plate N. It is provided with a socket $n$, having a wall constituting a section of the surface of a sphere. Board M has a recess $m$ lying opposite to and coinciding with the above-described recess $n$. Outside of the part M there is another metallic plate O, in which there is formed a socket $o$, the inner wall of which is a part of a sphere, with an opening $o'$. The three parts M, N, and O can be secured together in any suitable way. As shown, they are fastened by means of bolts at $m'$, the heads and nuts of which rest against insulating material at M'.

P represents a ball adapted to be held in place between the plates N and O, it resting against the spherical walls of the socket at $o$. This ball has an aperture $p$ formed therein, and with it there is cast, or to it secured, a strong stem-like production P', which latter has a longitudinal aperture $p'$. Into the said aperture $p$ there is inserted an insulating-plug $P^2$, having a central longitudinal aperture, in which there is fitted a brass tube $p^2$.

Q Q' indicate the positive and the negative conductors on one side of the connection, and $q$ $q'$ indicate the conductors on the other side thereof. The conductor Q is firmly connected by solder or otherwise to the metallic projection P' of the ball P. The conductor Q' is throughout the greater part of its length surrounded by insulating material, and is passed through the aperture $p'$ in the part P', and the metallic part thereof is firmly united to the said brass tube $p^2$.

R is a contact-piece, of brass or other suitable material, having a spherical convex surface at $r$ and a cylindrical shank $r'$, which is inserted into the brass tube $p^2$. In the inner end there is an aperture in which lies a coiled spring $r^2$, which tends to hold the contact-surface at $r$ snugly against the concave surface at $n$.

It will now be seen that if a current is passing through the conductors above provided it will go from the wire at $q$ through the parts at O, P, and P' to the conductor at Q and back through the wire Q' and the parts $p^2$, R, and N to the wire $q'$, or vice versa. It will also be seen that by reason of the ball-and-socket devices interposed in the circuit there can be considerable play of the parts constituting the circuit on one side of said ball and socket relatively to the parts on the other side thereof without tending to wear, strain, or break the wires or other more delicate parts of the circuit.

S is a hose, rubber tube, or other suitable insulating and protecting device surrounding the wires Q Q'. It is clamped at $s$ to the projection P' of the ball.

The terminals of the motor are indicated by the wires at $q^2$ $q^3$. One of these is secured by binding-screw or otherwise to a metallic socket-piece T and the other to a pin or contact T', the latter two parts being secured to a board or piece of other insulating material $P^3$, which insulates them both from each other and from the metallic parts of the machine. Now the other end of the hose S is fastened in a portable wooden insulated handle, formed in halves, (indicated by U U'.) Each of these has one-half of a cylindrical socket at $u$ of such diameter and length that the end of the hose S can be placed therein and (when the two halves are put together) strongly clamped by the devices shown by $n'$, the parts U U' of the terminal handle having at their forward ends the halves of a conical or flaring socket $u^2$ and of a spherical socket $u^3$. There are two metallic pieces $u^4$, each adapted to fit one of the halves of the last said socket, and each formed with a half-conical socket $u^6$. When the two halves of the handle are brought together, the parts $u^4$ $u^5$ lie together and are adapted to engage with the contact-pin T', the spherical part at $u^5$ acting to hold them against longitudinal displacement. The forward ends of the parts U and U' are reduced somewhat, so as to produce a shoulder at $u^7$ to abut against the end of the socket T. The outer face of the half U of the handle is cut out and rabbeted to form a recess, and into the recess thus provided there is inserted a metallic piece of the character shown at $U^2$. When in place, it makes the half to which it is applied of the same exterior shape as that of the other half, except that there is a projection at $u^8$, which is adapted to register with and move along a groove $t$ in the socket-piece T parallel with its axis, and also adapted to then turn into a transverse groove $t'$. These grooves $t$ $t'$, together with the pin $u^8$, constitute virtually a "bayonet-joint."

The conductors Q Q' are carried through the hose S and somewhat beyond it. That at Q is passed through apertures $u^9$ in the metallic pieces $u^4$ and secured by solder or otherwise. The conductor Q' is carried to the metallic piece $U^2$ and firmly secured thereto.

When the above-described parts of the terminal handle are secured in place, the necessary contacts can be readily made and broken between the machine and the outside circuit. It is merely necessary to thrust the parts U and U' into the socket T, the pin $u^3$ being turned to register with the slot $t$. When the slot $t'$ is reached, it is given a partial turn, forcing the pin around into the same and preventing the handle from being withdrawn. At this time there is contact between the metal parts $u^4$ and the pin T' on the one hand and the outside piece $U^2$ and the socket-wall T.

When the above-described parts are all in place, the path of the current will be readily understood. Supposing it to enter along wire Q, it passes thence to the metal piece $U^2$, the socket-wall T, and the wire $q^2$ to the motor, and from the latter returns through the wire $q^3$, contact-pin T', metal piece $u^4$, and wire Q.

I am aware that trolley-conductors of various sorts have been made or suggested, including arms or bars which extend downwardly from the cars to underground conductors, as well as those having overhead conductors, with trolley bars or supports pivoted or otherwise secured to the roofs of cars; but I believe myself to be the first to have devised a trolley-car system of the sort presented, particularly one adapted for use in mines. With such cars it is necessary to change the position of the parts every few minutes, as in gathering the coal-cars and moving them back and forth over short distances in the entries, and hence it is a matter of great advantage to have the socket or stand containing the motor-terminal and the readily-detachable arm or bar to fit said socket, together with a conductor-support extending to the trolley, and a universal joint for said conductor-support between the trolley and the motor-terminal.

By providing a tubular terminal in the detachable arm or bar and arranging the motor-terminal centrally within the stand I can insure a wide surface of contact and yet permit sufficient axial motion of the arm or bar.

A device of this sort successfully obviates the necessity of binding-screws on the machine to make the connections and obviates also the necessity of the operatives handling the exposed parts of the circuit. By a slight movement of the hand the electric circuit is completed with the machine, and by another movement as slight the machine and circuit are separated.

In Figs. 3 and 4 there is shown a modification of the gearing and power-transmitting devices interposed between the motor and the car-wheels. In this case use is made of intermediate shafts A' and $A^2$, and these respectively carry the worm-wheels J and J'. The shaft G is in this case parallel to the power-shaft $b$ and the intermediate shaft $d$, and the cross-shafts A' and $A^2$ are respectively above and below this shaft G. Each of them is provided with pinions $a'$, which mesh with gear-wheels $a$, formed upon or secured to the track-wheels. In this construction there is also shown a preferred means of connection between the initially-driven parts and those more remote from the engine, they being the members of the clutch of which the part D' is secured to the shaft $d$ and part G' is mounted upon and held by a feather to the shaft G. This part G' can by any suitable shifting devices be moved into and out of engagement with part D'. It is often desirable, as in going downhill, to break the connection entirely between the motor-gearing and the track-wheels, so that the movements of the latter shall be independent of the quantity of current which is passing through the motor, and this can be accomplished by means of the devices last above referred to.

The traveling contact-carriage L has wheels, (indicated by L' L'.) I prefer to make these in a way more or less similar to that indicated in Fig. 19. That is to say, I provide two cast-iron (either ordinary or malleable) halves, each with a socket near the central part, which is filled with Babbitt metal to lie in contact with the journal. Then I place one or more comparatively thin sheets of copper between the halves of the wheel and bolt or otherwise fasten the several parts firmly in place. The edges of the copper sheets may project a little beyond the line of the periphery and be turned down, so as to provide a contact-surface to ride on the stationary conductors K K'. Those acquainted with the work which has been heretofore done in connection with such contacts know that great trouble and expense have been incident to them. They should contain good conducting metal, and hence have been generally made of one or the other kind of brass; but inasmuch as they are liable to be burned and impaired, owing to the repeated making and breaking of contact with the conductors, they have, as heretofore made, lasted but a short time, and hence have been, as said above, a source of expense and inconvenience. The wheel I herein provide is cheaply made, can be provided with all the necessary metal for conductivity, can be mounted so as to have but little friction on the pintles or journals, and can be readily repaired in case either the conductor metal or antifriction metal should become worn out.

What I claim is—

1. In a system of electrical distribution the combination with the positive and negative conductors of an insulating-support V, the brackets secured thereto for the conductors respectively, and the reversible holders interposed between the conductors and the brackets, and detachable from the conductors substantially as set forth.

2. The combination of the positive and negative conductors, the support V, for them in common, brackets, W, conductor-holders X adapted to be secured either above or below said brackets, detachably secured to the conductors and means substantially as described for fastening the holders to the brackets as set forth.

3. The combination of the stationary conductors, the contacts traveling on said conductors, the supports for said contacts, supplemental contacts, as at N, O on said support, the movable section of a branch circuit having contacts having collecting-surfaces held against the contact-surfaces at N, O, as set forth whereby they can be moved relatively to the last said surfaces, said movable section being adapted to convey current from said conductors to a motor or other translating device, substantially as described.

4. The combination of the movable contact-carriage, having conductor-plates N O, insulation M between them, conductors R and P movable axially relatively to conductors N and O, and held against them and insulation $P^2$ between conductors R and P, substantially as set forth.

5. In an electric circuit the combination of conductors N O, insulation M between them, conductors R and P, insulation $P^2$ between them, and spring $r^2$, arranged substantially as set forth to hold the positive conductors and the negative conductors respectively in contact.

6. The combination with relatively stationary conductors N O of conductors P and R universally jointed to conductors N O, insulation $P^2$, conductors Q Q' and a protecting-hose S connected to one of the conductors P, R, substantially as set forth.

7. In an electric-railway system having a car and an overhead electric conductor, the combination of a trolley moving in contact with said conductor, a motor on the car having an insulated terminal, a socket inclosing and insulated from said terminal, a bar or arm detachably fitted to the said socket and vibratable therein and having an inclosed terminal arranged to contact with the terminal in the socket, there being between the trolley and said terminal in the detachable arm a conductor-section passing through the said detachable bar or arm, substantially as set forth.

8. In an electric-railway system having a car and an overhead electric conductor, the combination of a trolley moving in contact with said conductor, a motor on the car having an insulated terminal, a socket inclosing and insulated from said terminal, a bar or arm detachably fitting said socket and containing a tubular terminal adapted to fit around the terminal in the socket, and a portable section of electric conductor extending from said tubular terminal to the aforesaid trolley, substantially as set forth.

9. In an electric-railway system having a car and an overhead electric conductor, the combination of a trolley moving in contact with said conductor, a motor on the car, an outward-projecting tubular socket or stand rigid with the motor and having centrally arranged therein an insulated terminal of the motor-circuit, a bar or handle detachably fitting said socket and movable axially therein, a terminal in said bar or handle to fit against the aforesaid central terminal in the socket, and an electric-conductor section extending from the said terminal to the trolley, substantially as specified.

10. In an electric-railway system having a car and an overhead electric conductor, the combination of a trolley moving in contact with said conductor, a motor on the car, a socket or stand thereon containing a terminal of the motor-circuit, a relatively short arm or bar detachably fitting the said socket and having a terminal opposed to that aforesaid and having a movable section of conductor-circuit passing therethrough and extending therefrom to the trolley, and means for supporting that part of the movable electric circuit which is outside of the said relatively short socket arm or bar, said supporting means being universally adjustable relatively to said socket or stand, whereby the trolley can be drawn in any direction by the said arm without interrupting the circuit at the terminals in said socket, substantially as set forth.

11. In an electric-railway system having a car and an overhead electric conductor, the combination of a motor on the car, a socket or stand on the car containing terminal of the motor-circuit, an arm or bar detachably fitted to the said socket and carrying a terminal, a trolley moving in contact with said overhead conductor, a traveling support or carrier on which the said trolley is journaled, a conductor-wire secured to said trolley-support and extending to the terminal in the said socket arm or bar, and a universal joint interposed between the said trolley-support and the motor-terminal, whereby the electric conductor can be extended in either direction from the car without interrupting the circuit at the motor-terminal, substantially as set forth.

12. In an electric-railway system having a car and an overhead electric conductor, the combination of a motor on the car, a trolley-wheel moving on the said overhead conductor, a portable-conductor section detachably connected to the terminal of the motor on the car and extending to the said trolley, a support for the said portable-conductor section by which it is firmly supported between the trolley and the motor, said portable conductor having a socketed part and an arm or bar mounted in the socket in the said part and adapted to freely vibrate or rock therein, the conductor-section passing through the said arm or bar, substantially as specified.

13. In an electric-railway system having a car and an overhead electric conductor, the combination of a motor on the car, a trolley-wheel moving on the said overhead conductor, a portable-conductor section extending downward from the said trolley and detachably connected with a terminal on the motor-circuit, a non-conducting support for the trolley and its portable circuit, said support having therein a socketed part with a terminal at its inner end or bottom, and a convex or journal-like part fitted in the socketed part, and having a terminal bearing against the aforesaid terminal, and having an arm or bar through which passes a part of the portable electric circuit, said arm or bar and journal-like part being adapted to rock or vibrate freely in said socketed part, substantially as set forth.

14. In an electric-haulage system for mines, a track, an overhead conductor, a car on said track, an electric motor on said car having a socket containing one or more terminals, and a movable-conductor section having a trolley-wheel for traveling along said overhead conductor, a holder at the lower end of the trolley adapted to be inserted in said socket and a joint interposed between the motor-terminals in said socket, and the trolley-wheel, said joint being interposed between two parts of the movable-conductor section and adapted to permit one of them to swing or rock as to the other without interrupting the circuit, substantially as set forth.

In testimony whereof I affix my signature in presence of two witnesses.

DAVID N. OSYOR.

Witnesses:
MARY W. TAFT,
A. J. PEMBROKE.